United States Patent
Parmer et al.

(10) Patent No.: US 8,342,854 B2
(45) Date of Patent: Jan. 1, 2013

(54) LANGUAGE-BASED COMPUTER GENERATED INSTRUCTIONAL MATERIAL

(75) Inventors: Anna Parmer, Baltimore, MD (US); Joe Tojek, Owings Mills, MD (US); John Stuppy, Columbia, MD (US)

(73) Assignee: Educate Online Technology, LLC, Baltimore, MD (US)

( * ) Notice: Subject to any disclaimer, the term of this patent is extended or adjusted under 35 U.S.C. 154(b) by 0 days.

(21) Appl. No.: 10/265,666

(22) Filed: Oct. 8, 2002

(65) Prior Publication Data

US 2003/0049593 A1 Mar. 13, 2003

Related U.S. Application Data

(63) Continuation-in-part of application No. 09/678,030, filed on Oct. 3, 2000, now Pat. No. 6,592,379, which is a continuation of application No. 09/275,793, filed on Mar. 25, 1999, now Pat. No. 6,146,148, which is a continuation of application No. PCT/US97/16672, filed on Sep. 24, 1997, which is a continuation-in-part of application No. PCT/US01/28645, filed on Sep. 14, 2001.

(60) Provisional application No. 60/026,680, filed on Sep. 25, 1996, provisional application No. 60/233,061, filed on Sep. 14, 2000, provisional application No. 60/328,445, filed on Oct. 12, 2001.

(51) Int. Cl.
*G09B 19/00* (2006.01)
*G09B 19/26* (2006.01)
*G09B 3/00* (2006.01)

(52) U.S. Cl. ......... 434/323; 434/322; 434/350; 434/362
(58) Field of Classification Search .......... 434/156–157, 434/185, 219, 322, 323, 350, 362
See application file for complete search history.

(56) References Cited

U.S. PATENT DOCUMENTS

| | | | | |
|---|---|---|---|---|
| 4,037,332 | A | * | 7/1977 | Petrusinsky .............. 434/307 R |
| 4,414,621 | A | | 11/1983 | Bown et al. |
| 4,435,772 | A | | 3/1984 | Suzuki et al. |
| 4,503,499 | A | | 3/1985 | Mason et al. |
| 4,764,120 | A | | 8/1988 | Griffin et al. |
| 4,793,813 | A | | 12/1988 | Bitzer et al. |
| 4,939,509 | A | | 7/1990 | Bartholomew et al. |
| 5,002,491 | A | | 3/1991 | Abrahamson et al. |
| 5,107,443 | A | | 4/1992 | Smith et al. |
| 5,176,520 | A | | 1/1993 | Hamilton |
| 5,206,934 | A | | 4/1993 | Naef, III |
| 5,208,912 | A | | 5/1993 | Nakayama et al. |
| 5,220,657 | A | | 6/1993 | Bly et al. |
| 5,261,823 | A | * | 11/1993 | Kurokawa ..................... 434/323 |

(Continued)

FOREIGN PATENT DOCUMENTS

EP 0106213 B1 12/1987

(Continued)

*Primary Examiner* — Milap Shah
(74) *Attorney, Agent, or Firm* — Faegre Baker Daniels LLP

(57) ABSTRACT

A learning system includes a plurality of teacher and student stations for holding one or more learning sessions between a teacher and one or more students. A server serves instructional material for creating a learning environment during the learning session, and a database stores at least one of teacher and student attributes that relate to language ability. In the present invention, the instructional material is a computer generated instructional material that is produced based on the language ability of the student or the teacher.

15 Claims, 12 Drawing Sheets

U.S. PATENT DOCUMENTS

| | | | |
|---|---|---|---|
| 5,267,865 A * | 12/1993 | Lee et al. .................... | 434/350 |
| 5,280,583 A | 1/1994 | Nakayama et al. | |
| 5,293,619 A | 3/1994 | Dean | |
| 5,302,132 A | 4/1994 | Corder | |
| 5,303,042 A | 4/1994 | Lewis et al. | |
| 5,306,154 A | 4/1994 | Ujita et al. | |
| 5,310,349 A * | 5/1994 | Daniels et al. ............... | 434/350 |
| 5,311,422 A | 5/1994 | Loftin et al. | |
| 5,318,450 A | 6/1994 | Carver | |
| 5,395,243 A * | 3/1995 | Lubin et al. .................. | 434/118 |
| 5,437,555 A | 8/1995 | Ziv-El | |
| 5,441,415 A * | 8/1995 | Lee et al. .................... | 434/350 |
| 5,473,367 A | 12/1995 | Bales et al. | |
| 5,564,043 A | 10/1996 | Siefert | |
| 5,597,312 A | 1/1997 | Bloom et al. | |
| 5,699,526 A | 12/1997 | Siefert | |
| 5,721,906 A | 2/1998 | Siefert | |
| 5,727,950 A | 3/1998 | Cook et al. | |
| 5,727,951 A * | 3/1998 | Ho et al. ...................... | 434/362 |
| 5,743,743 A | 4/1998 | Ho et al. | |
| 5,788,508 A * | 8/1998 | Lee et al. ..................... | 434/350 |
| 5,810,605 A | 9/1998 | Siefert | |
| 5,823,788 A * | 10/1998 | Lemelson et al. ........... | 434/350 |
| 5,850,629 A | 12/1998 | Holm et al. | |
| 5,862,223 A | 1/1999 | Walker et al. | |
| 5,863,208 A * | 1/1999 | Ho et al. ...................... | 434/362 |
| 5,904,485 A | 5/1999 | Siefert | |
| 5,947,747 A | 9/1999 | Walker et al. | |
| 6,029,043 A | 2/2000 | Ho et al. | |
| 6,039,575 A * | 3/2000 | L'Allier et al. ............... | 434/323 |
| 6,064,856 A | 5/2000 | Lee et al. | |
| 6,115,712 A | 9/2000 | Islam et al. | |
| 6,141,529 A * | 10/2000 | Remschel .................... | 434/350 |
| 6,146,148 A | 11/2000 | Stuppy | |
| 6,154,631 A | 11/2000 | Remschel | |
| 6,177,940 B1 | 1/2001 | Bond et al. | |
| 6,287,125 B1 * | 9/2001 | Dorcely ....................... | 434/323 |
| 6,302,695 B1 * | 10/2001 | Rtischev et al. ............. | 434/157 |
| 6,325,632 B1 * | 12/2001 | Chao et al. ................... | 434/322 |
| 6,358,053 B1 * | 3/2002 | Rosenfield et al. .......... | 434/156 |
| 6,397,036 B1 * | 5/2002 | Thean et al. ................. | 434/350 |
| 6,427,063 B1 * | 7/2002 | Cook et al. ................... | 434/350 |
| 6,438,353 B1 * | 8/2002 | Casey-Cholakis et al. ... | 434/350 |
| 6,463,460 B1 * | 10/2002 | Simonoff ..................... | 709/203 |
| 6,565,358 B1 * | 5/2003 | Thomas ....................... | 434/157 |
| 6,741,833 B2 * | 5/2004 | McCormick et al. ......... | 434/350 |
| 6,804,489 B2 * | 10/2004 | Stuppy et al. ................ | 434/350 |
| 2001/0018177 A1 * | 8/2001 | Dusen .......................... | 434/156 |
| 2001/0049087 A1 * | 12/2001 | Hale ............................. | 434/350 |
| 2002/0051958 A1 * | 5/2002 | Khalsa ......................... | 434/238 |
| 2002/0147799 A1 * | 10/2002 | Alhalabi et al. .............. | 709/220 |
| 2003/0049594 A1 * | 3/2003 | Stuppy et al. ................ | 434/322 |

FOREIGN PATENT DOCUMENTS

| | | |
|---|---|---|
| EP | 279558 | 7/1993 |
| JP | 3327328 | 12/1991 |
| WO | WO 92/02287 | 2/1992 |
| WO | WO 93/16454 | 8/1993 |
| WO | WO 93/21618 | 10/1993 |

* cited by examiner

FIG. 10 eSYLVAN™
log on. learn.

Progress Assessment Report
Christopher Zellers
Academic Reading
Report Date: Thursday, January 31, 2002

| Assessment | School Grade | Test Sequence | Admin Date |
|---|---|---|---|
| Diagnostic | 8 | CAT 18E Reading | 11/11/00 2:00:00 PM |
| Hour 72 | 8.4 | CAT 18E Reading | 1/20/02 1:47:37 PM |

| | Scaled Score | | Percentile | | Grade Equivalent* | | |
|---|---|---|---|---|---|---|---|
| | Diagnostic | Hour 72 | Diagnostic | Hour 72 | Diagnostic | Hour 72 | Change |
| Vocabulary | 615 | 734 | 1 | 25 | 2.1 | 6.8 | 4.7 |
| Comprehension | 694 | 715 | 15 | 5 | 4.3 | 5.4 | 1.1 |
| Total | 655 | 725 | 3 | 15 | 2.9 | 6.3 | 3.2 |

Diagnostic Assessment vs. Progress Assessment

- 2.1 / 6.8
- 4.3 / 5.4
- 2.9 / 6.1

1.0  2.0  3.0  4.0  5.0  6.0  7.0  8.0  9.0

☐ Grade Level at Diagnostic Assessment   ☐ Grade Level at Progress Assessment eSylvan administers standardized tests on an individual basis for placement within an eSylvan

FIG. 11

LANGUAGE-BASED COMPUTER GENERATED INSTRUCTIONAL MATERIAL

RELATED APPLICATIONS

This application 1) is a continuation-in-part of U.S. patent application Ser. No. 09/678,030 filed Oct. 3, 2000 now U.S. Pat. No. 6,592,379, which is a continuation of U.S. patent application Ser. No. 09/275,793, filed Mar. 25, 1999, now U.S. Pat. No. 6,146,148, which is a continuation of PCT/US97/16672, filed Sep. 24, 1997, and claims the benefit of U.S. Provisional Patent Application Ser. No. 60/026,680, filed Sep. 25, 1996, 2) is a continuation-in-part of PCT/US01/28645, filed Sept. 14, 2001, and claims the benefit of U.S. Provisional Patent Application Ser. No. 60/233,061, filed Sep. 14, 2000, and 3) claims the benefit of U.S. Provisional Patent Application Ser. No. 60/328,445, filed Oct. 12, 2001, all of which are hereby incorporated by reference.

FIELD OF THE INVENTION

This invention generally relates to a learning system and method for engaging in interactive and non-interactive learning sessions and more particularly to a learning system and method that is implemented over a network, such as the Internet.

BACKGROUND OF THE INVENTION

In education, various advantages of using private teachers to give individual attention to accommodate each student's skill, educational goals and background are well known. Students can excel and improve immensely from the individual attention given. However, the costs involved including the cost of hiring private teachers and the cost of performing various tests/assessments of the student's skill, educational goals and background in designing individualized curriculum make the private teacher approach too expensive for most students.

Many conventional educational systems attempt to personalize learning sessions for students and avoid the cost of employing private tutors by using computer programs in place of actual teachers. However, these systems have gone too far in automating educational processes and consequently have been shown to be too automated and lacking the necessary involvement by actual teachers to make the systems effective.

For instance, U.S. Pat. No. 5,727,950 issued to Cook et al. discloses a system for interactive, adaptive and individualized computer-assisted instruction. The system delivers interactive, adaptive, and individualized homework to students in their homes and other locations. An agent becomes a virtual tutor acting as a student's personal and individualized tutor. The agent is individualized to each student and formed by the functioning of agent software with student data object. The student data object stores characteristics of the student and assignments set by the teachers and administrators.

Teachers use the system to perform such functions as entering initial profiles in student data objects, assigning students to subgroups, previewing, annotating and scheduling assignments, reviewing and commenting on completed homework assignments, and reviewing summary reports. Important teacher activities are as follows: the teacher controls the access and level of tools available to the student and limits the extent to which the student can alter agent personae; the teacher controls the student's use of the system by assigning, scheduling, and prioritizing the student's access to the instructional material; the teacher can customize material available to the students by modifying sequencing of instructional lessons, choosing the homework the student must complete, and sending messages to students; and the teacher's class management is aided by a facility to send messages, reminders, hints, etc., to students using email facilities.

A teacher can also add comments, if student homework is viewed on line by teacher. Email and newsgroups are used by teachers, non-interactively, to send information to their classes, such as schedule and material changes. Students can communicate with their teachers, and share work or interests with other students.

U.S. Pat. No. 5,904,485 issued to Siefert discloses a computer-assisted education where an INTELLIGENT ADMINISTRATOR, which takes the form of a system of programs and computer objects, organizes instructional activity, selects the proper lessons for each session, and administers examinations to the students. A given lesson is presented in successive, different ways, if the student does not master the lesson the first time. A help screen is available at any point during an instructional unit and allows a student to change skill levels, learning styles, request another explanation, and request a conference with a teacher. When the request for a conference is selected, the student is connected to a live videoconference with a teacher. A live conference option with subject matter experts makes it possible for a student who has mastered the unit but who is curious about tangential or deeper levels of the material to ask questions while his or her interest is still fresh.

U.S. Pat. No. 6,064,856 issued to Lee et al. discloses a learning system where all student workstations are in constant communication with a teacher's workstation via a LAN interface and local area network. Real-time communication between a student workstation and a teacher workstation allows the teacher to be informed of the student's progress and activities as well as allowing the teacher to tailor instructional programs for each student. The teacher can select material, including text, illustrations, length of lesson and questions to be answered, to comprise the courseware for a subject. Assignment process is controlled by the CPU of the teacher's station which downloads the control programs corresponding to the lesson segments selected by the teacher and/or a system program from the hard drive or other storage device of the teacher's workstation to the selected student's station.

After a predetermined number of tries, if the student still fails to grasp the material and answers some questions incorrectly, the system will send a message to the teacher's workstation indicating which material the student is having problems with. The teacher can then use his or her own methods to personally help the student to grasp the material.

U.S. Pat. No. 5,176,520 issued to Hamilton discloses a computer-assisted instruction system for a classroom which allows a teacher to share an electronic sheet of paper with one or more students in the classroom, enabling both the teacher and a student to write on the same sheet virtually simultaneously from different parts of the room. As a student physically writes on the surface of his monitor with the stylus, the image that is written not only appears on that student's display, but is also transmitted simultaneously to the teacher's station. When the teacher touches the screen where an icon for a student appears, the teacher and the student can begin handwritten screen-sharing communication.

U.S. Pat. No. 5,002,491 issued to Abrahamson et al. discloses a learning system for enabling teachers to teach students concepts and to receive immediate feedback regarding how well the student have learned the concepts. Students have a keyboard system to enable them to respond in a narrative fashion to questions posed to an entire class and the teacher is able to receive the responses individually as they are stored by the system at a central computer. If a relatively low percentage of students, as determined by the teacher, seem to be understanding the concept being taught, the teacher may choose to assign additional work to students, or may take remedial actions.

U.S. Pat. No. 5,302,132 issued to Corder discloses a system for reducing illiteracy of individuals by using computer technology to integrate multi-sensory stimuli for synthesis of individualized instruction, evaluation, and prescription for advancement of communications skills. The system will accept input from the teacher to control lesson scope and sequence and alternatively, the system itself contains decision rules to determine student needs based on the evaluation of system provided graded stimuli and matching student responses. If directed by the teacher, the system, through its speech synthesizer, encourages the student to use the available system resource, such as a touch screen, to trace the phonogram on the screen. If the teacher believes that a student needs special encouragement during the lesson, a message can be recorded using the "New Messages" button.

A common feature in all of the above mentioned educational systems is that they rely almost exclusively on just one type of the computer program tutoring method or the personal teacher tutoring method so that they do not fully realize the benefits of both methods. Further, none of these systems shows a computer-aided learning system for holding several concurrent learning sessions with students, where each learning session is selected by a teacher to be either an interactive learning session where the teacher interacts with the student on a shared basis or a non-interactive learning session where the student works independently of the teacher.

Hence, there has been a long sought desire among educators to develop a computer-assisted educational system that allows a balanced use of both the computer program tutoring method and the personal teacher tutoring method. With the on going desire to globalization, there is a desire to deliver instructional material developed in one country, for example in the United States, internationally.

SUMMARY OF THE INVENTION

Briefly, according to the present invention, a learning system includes a plurality of teacher and student stations for holding one or more learning sessions between a teacher and one or more students. A server serves instructional material for creating a learning environment during the learning session, and a database stores at least one of teacher and student attributes that relate to language ability. In the present invention, the instructional material is a computer generated instructional material that is produced based on the language ability of the student or the teacher.

According to some of the more detailed features of the present invention, the computer generated instructional material comprises at least one of instructional software, an electronic textbook, a work sheet, a practice sheet, and a problem set. Also, the computer generated instructional material comprises a test for assessing at least one of a skill gap or a lesson prescribed for addressing at least one of a skill gap.

In an exemplary embodiment, the computer generated instructional material is automatically created when a teacher and a student engage in an interactive practice session, while at least one other student is involved in a non-interactive learning session. The computer-generated instructional material can also be generated using a computer adaptive assignment process.

According to some of the detailed features of the present invention, the database comprises at least one of a central database and a distributed database. Also, the database can be at least one of a public school database and a private school database. The retrieved student attribute can include at least one of skill level, grade, ethnic background, age, language, character, past record, grade in a subject, and economic background, and the retrieved teacher attribute can include at least one of a skill level, a subject proficiency level, an hourly rate, geography, overtime requirement, and work schedule.

DESCRIPTION OF THE DRAWINGS

FIG. 10 shows an exemplary math application in an electronic teacher workbook according to the one embodiment of the invention.

FIG. 11 shows an exemplary progress assessment report accessible by a parent via a parent site.

DESCRIPTION OF THE PREFERRED EMBODIMENTS

Figure 1:
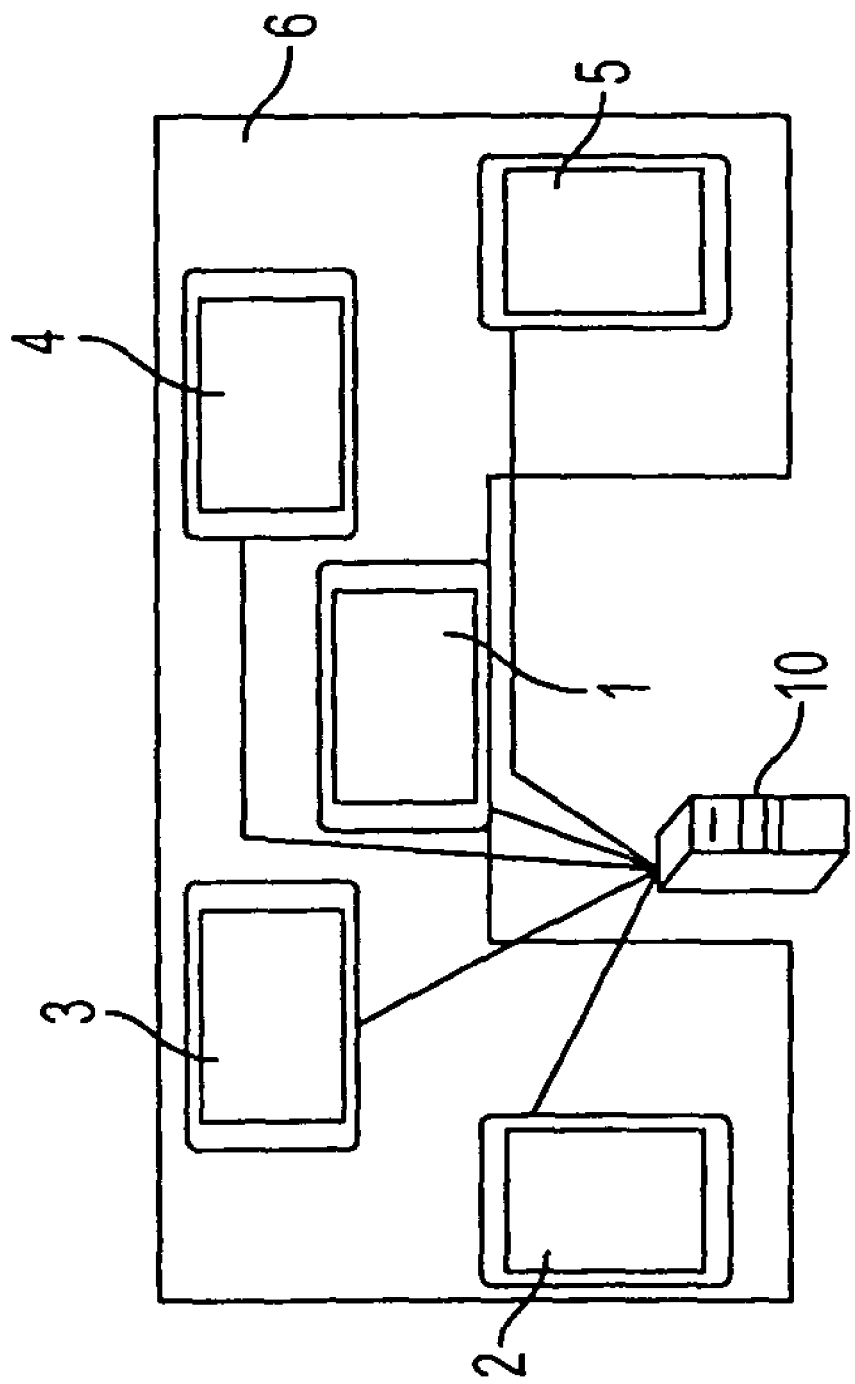
FIG. 1 is a diagram of a local area network (LAN) system according to one embodiment of the present invention.

FIG. 1 shows the simplest form of a learning system for holding interactive and non-interactive learning sessions according to the present invention by creating a suitably configured learning environment. The system is designed for use by a teacher and a number of students over a local area network (LAN). The LAN includes a server station or any other type of controller 10 and client stations 1-6, which comprise teacher and student workstations. The teacher uses a teacher workstation 1, and the students use student workstations 2-5. As used herein, instructional material include any data or software useful in giving instructions. In an exemplary embodiment, the teacher workstation 1 and the student workstations 2-5 are networked client stations each with a pen-based tablet input and display. The teacher can send selected instructional materials to each of the students over the network. The teacher can also see what each student is doing on the display of the teacher workstation 1 upon receipt of corresponding images from the student workstations 2-5.

The server station 10 stores the instructional material along with other data in a suitably configured database (not shown). The learning environment within each learning session can comprise any instructional material or content, including learning workspaces in the form of student or teacher workbooks, shared whiteboards, and etc. The instructional material or content can also include instructional software, electronic text books, work sheets, practice sheets, problem sets, and etc. A learning environment for students can also include reference tools, such as dictionary, encyclopedia, thesaurus, calculator, and etc.

Figure 2:
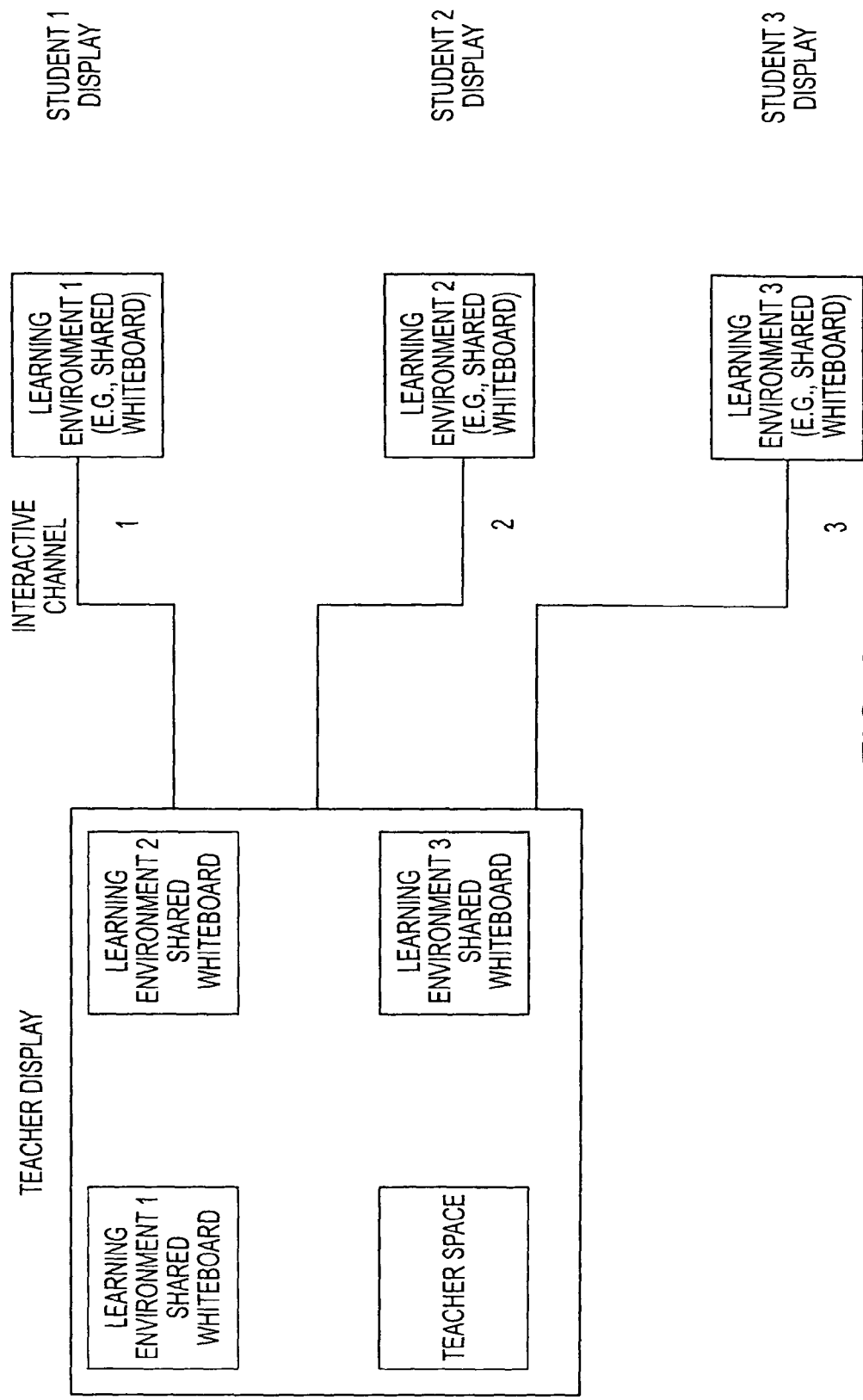
FIG. 2 shows an exemplary teacher workstation display and three-student work station displays being shared interactively according to the present invention.

Even though FIG. 2 discloses the server station 10, another embodiment of the present invention is a peer-to-peer network. A peer-to-peer network does not have a server and the teacher workstation 1 is networked to student workstations directly without an intervening server. In this peer-to peer embodiment, the teacher workstation 1 is a controller that serves instructional material directly to student stations without help of an intervening server for serving the instructional material. Therefore, as herein defined, the term's server station and controller can be used interchangeably. The learning system of the present invention can be used for any type of learning purpose in any organization including corporations, private or public schools, learning centers, firms, churches, governments, training classes, universities, colleges, etc. The instructional material can be on various topics including, school subjects, university class subjects, training materials, preparation courses, graphic design classes, etc. The subject can also cover any topic, for example, industrial, healthcare, academic, finance, transportation, legal, etc.

FIG. 2 shows an exemplary TEACHER DISPLAY with a display mode in which the teacher can interact with one or more students by using shared whiteboards 1-3. Even through FIG. 2 show only three student displays 1-3; more student displays can be used in the present invention. The shared white boards of the TEACHER DISPLAY are each assigned to a different student, as shown in FIG. 2. Each whiteboard can support displaying of free-style handwriting on a tablet. At another display mode, the TEACHER DISPLAY may display on the whole screen instructional material, which is to be assigned to students after the teacher reviews them.

During an interactive learning session, the teacher can assign the same question to multiple students at the same time and work with them interactively on a shared basis. Via an interactive voice channel, for example, the teacher can orally interact with selected students concurrently. According to one aspect of the present invention, non-interactive sessions are held separately from interactive sessions. During non-interactive learning sessions, instructional material, which can be predefined, pre-designed, or canned instructional materials, is presented to the students. As such, non-interactive learning sessions do not require teacher interactions. Therefore, the system of the invention allows for a combination of interactive and non-interactive learning sessions to be held with a plurality of students, where a teacher can hold an interactive learning session with at least one student, while other students engage in non-interactive learning sessions. The teacher can switch one or more students from interactive learning sessions to non-interactive learning sessions and vice versa as the teacher sees fit to accommodate students' educational needs.

Figure 3:
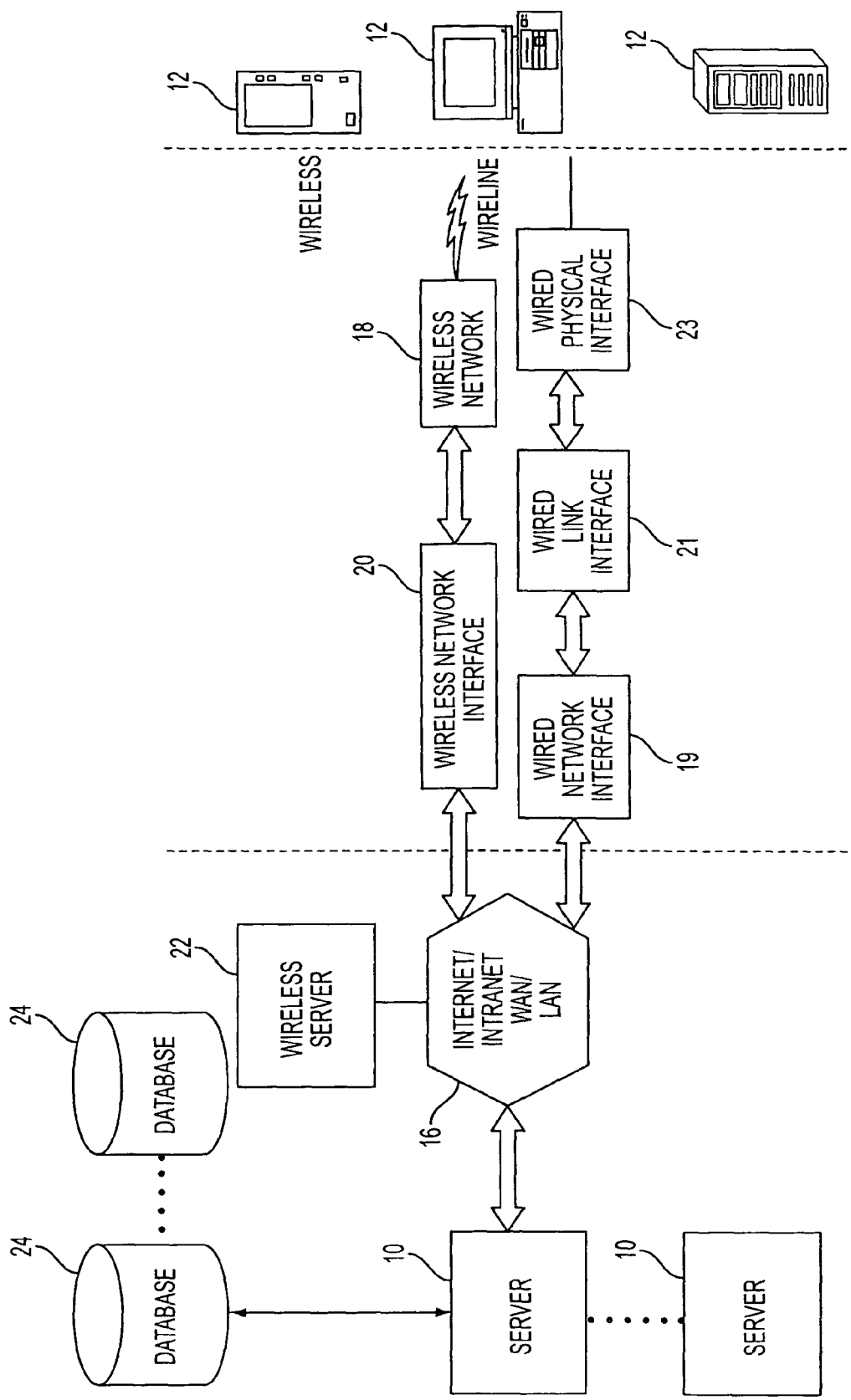
FIG. 3 is an exemplary block diagram of a web-based learning system according to another embodiment of the present invention.

FIG. 3 shows another embodiment of a system that implements the present invention. According to this embodiment, the system of the invention is implemented over a communication network that provides wired or wireless links with client stations 12 at remote locations. The client stations 12 can operate as teacher workstations, student workstations, guardian workstations, or director workstations. Preferably, standard protocols are utilized for the client stations 12 to connect to one or more server stations 10 (or any other type of controller). The network 16 can be any suitably configured network, such as the Internet. The Internet is a collection of interconnected (public and/or private) networks that are linked together by a set of standard protocols to form a global, distributed network.

The preferred embodiment of the present invention in FIG. 3 uses a client-server-computing model for creating various learning environments during learning sessions, where students and teachers interact with each other. Besides the Internet, the present invention can be implemented over any other types of networks such as corporate Intranets, LANs, WANs, etc. The students and teachers can utilize any wired and wireless devices that act as client workstations 12 for one or more servers 10, which serve instructional material via the networks. The students, student guardians, teachers and directors may be required to go through a log-in session before engaging in learning sessions or reviewing information such as student grades, progress reports, and etc. Other arrangements that do not require a log-in session can also be used in accordance with the present invention.

Under another embodiment, each client station 12 in use by a student, guardian, teacher or director executes a network access application program, such as a browser, for accessing the learning center servers 10. The system of FIG. 3 preferably uses a server-centric model that allows a user to use applications hosted on remote server 10 on his or her client station 12. The benefit of the server-centric model is that the client station 12 utilizes the server's memory and processor to run applications. This model resolves issues of limited memory and processor speed on client stations 12. Under yet another embodiment, the student and teacher workstations 12 can execute a locally stored learning application program for creating a learning environment.

The system of FIG. 3 can have either a central or distributed database system 24 that stores data relating to students, teachers, guardians, instructional materials, and etc; but the data can also be stored elsewhere within any storage medium that interacts within the system. The server 10, which is connected to the database system and the client stations over the network 16, preferably performs most of the centralized functions of the system, including creating learning environments during the learning sessions, generating and delivery of electronic workbooks and instructional materials, as well as performing diagnostic assessment and prescriptive learning activities. In FIG. 3, the client stations 12 can be any client device that is used by anyone involved in a learning activity, including a teacher, a student, a guardian, a director, and etc. Examples of such client stations 12 include personal computers, mobile computers, notebooks, workstations, and etc. The client stations 12 operate under workstation operating system, e.g., Windows or Mac OS operating systems. Other examples of suitable client stations 12 are personal digital assistant (PDAs) or palmtop computers that operate under an appropriately configured operating system, such as Palm OS or Windows CE. The client stations 12 are connected via either wireless network 18 or wired physical interface 23. Preferably, the client stations 12 perform real-time collection of student assessment information and include visual displays for providing visual interface with users.

The client stations 12 are also capable of communicating information in any form, including audio and video form, or in any other form conceivable by one skilled in the art. Each student workstation supports an interactive channel for holding a learning session with a teacher workstation. The interactive channel is a communication medium from one client workstation to another client station (e.g., teacher or student workstations). The interactive channel can be formed directly between two stations or by various networks including an Internet, Intranet, LAN, WAN, and etc. Each interactive channel can support different ways of communication by transmitting information in various formats, including audio, video, picture, sound, digital characters, etc.

In wireline communication, the server 10 preferably communicates with the wired client stations 12 through the network 16 and through network layer interfaces 19, 21, and 23. It should be noted that the network used in connection with the present invention can use any one of open- or proprietary-network standards, including the well-known Ethernet and TCP/IP protocols can be used.

For wireless communication, any wireless communication standards that support defined protocols can be used in the present invention. Examples of such protocols include GSM, IS-136, IS-95, Bluetooth, iDEN, Flex, ReFlex, IEEE 802.11 and etc. Under this arrangement, the server 10 communicates with client station 12 via a wireless network 18, but other available ways of wireless communication are also possible. Wireless client stations 12 can include mobile phones, Palm Pilots, and Personal Digital Assistants 18 (PDAs). The wireless network interface 20 operates as an interface between the wireless network 18 and the network 16. The wireless network interface 20 primarily serves to provide domain name resolution and serves to translate between the protocols and formats of the wireless network 18 and the network 16. The wireless server 22 provides user accessible information through the wireless network. The wireless server 22 can also retrieve content and information located on other servers and databases.

The databases 24, which are accessible by the server 10, can store various information related to learning activities in accordance with the learning system of the present invention. As stated above, the client stations 12 may include a personal computer, handheld communication devices, or any other devices capable of communicating with the databases 24 through the system of FIG. 3.

Various other ways, including a web-site access and an Intranet access, can allow access for teachers, directors, and students to communicate appropriate information. The teacher workstation is the launch pad to the learning environment that initiates a timer countdown for each learning session. The teacher workstation can allow access to various electronic student binder applications to which a teacher-only permission is applied for displaying information about students in upcoming sessions. The teacher workstation can allow access to teacher schedule data with links to a scheduling database that stores scheduling data. Preferably, the present invention supports numerous web-sites, including a teacher site, a director site, a student site, and a guardian or parent site. For example, the teacher can interact with a teacher site via the teacher workstation. Similarly, other participants can use their workstations to interact with a corresponding website.

The student site can be accessible to students and may include an age appropriate graphical screen that is displayed based on student attribute information, after a student logs into the site from a student workstation. Similar to the teacher site, the student member web site can be a launch pad to a learning environment during a learning session with a timer count down. The site also has links for educational games that students can play, while waiting for the start of learning sessions. The parent site includes information on student's grades, progress reports, appointments, schedules, attendance, and etc, which can be accessed after an authorized parent logs in.

Figure 4:
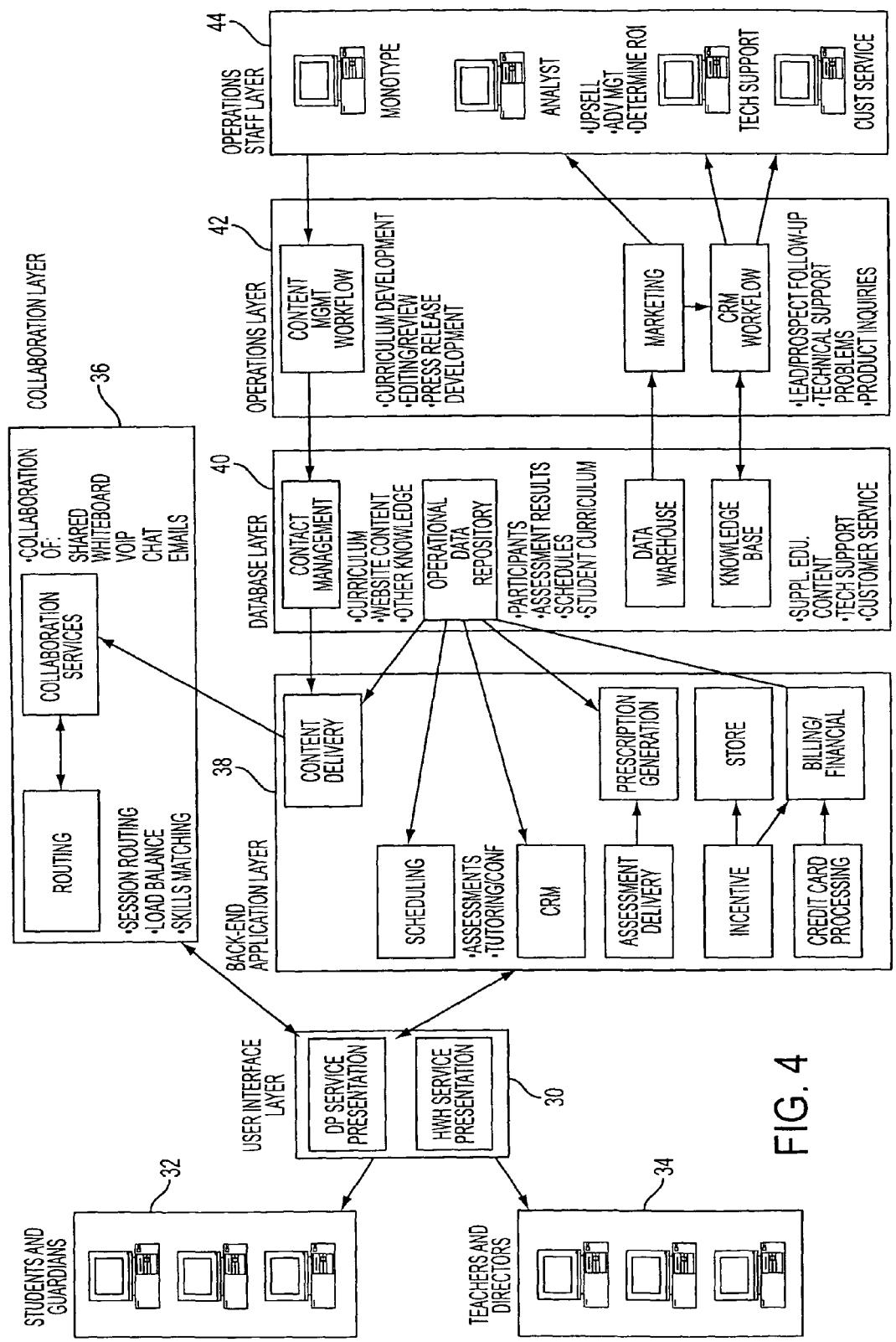
FIG. 4 is an exemplary functional block diagram of the system of the present invention.

Referring to FIG. 4, a block diagram of operation layers used by networked workstations and servers in the preferred implementation of the present invention is shown. Both the embodiments employing a server to facilitate interaction between various workstations and the embodiment employing the peer-to-peer network without a server can use the operation layers in FIG. 4. The system in FIG. 4 includes student and guardian workstations 32 as well as teacher and director workstations 34. The workstations 32 and 34 execute learning application programs for engaging in instructional activities during learning sessions. The learning application program running on a student workstation 32 enables a student to interact with a teacher during a non-interactive or an interactive learning session. The learning application program running on the teacher workstation 34 allows a teacher to engage plural students in multiple learning sessions. Various application programs for supporting the operation layers, including a user interface layer 30, collaboration layer 36, a back-end application layer 38, a database layer 40, an operations layer 42 and an operation staff layer 44 can be run by any of the server, workstations 32 and workstations 34 or any combination of them. The user interface layer 30 is responsible for presenting information to the teachers, students, and parents. The user interface layer 30 also communicates with a system delivery and prescription generation software within the back-end application layer 38, which performs assessment delivery and prescription generation functions within the learning system of the invention. The back-end application layer 38 also manages content delivery, scheduling, customer relationship management (CRM), incentive, credit card processing and billing functions.

The learning system according to one aspect of the present invention can support an incentive-based system for improvement, participation and effort during learning sessions as well as link to third party vendor sites for redeeming the token balances. As to the management of incentives in the back-end application layer 38, incentive controllers (teacher stations or servers) gives the students incentives for improvement, participation and effort during learning sessions. For example, a learning environment interface can deliver electronic tokens to students who satisfy defined incentive criteria for given learning sessions. When students satisfy the incentive criteria, incentive controllers informs the students of a defined number of tokens awarded by displaying them on student workstations. After the session closes, the number of awarded tokens are stored in databases of the incentive controllers for tracking purposes. For example, the number of earned tokens can be added to a stored number already in a database. Preferably, the earned token by the students can be redeemed at the web-site of a third party vendor, for such items as toys, books, games, software, and etc. The token balances stored in a student profile can be automatically transferred to the third party vendor so that the data entry by the student upon redemption is minimized.

The database layer 40 manages information storage functions related to content management, including curriculum, web-site (internet/intranet) content, and other knowledge base information. The database layer 40 can also be a repository for operational data including the participants, schedules, assessment results, and student curriculum. Data warehousing functions and statistical analysis of the assessment and learning data are also performed by the database layer 40. The database layer 40 also manages the knowledge base comprising, supplemental educational content, technical support, and customer service information.

The operations layer 42 can provide for content management workflow, including the curriculum development, editing and reviewing the development information. The operation layer 42 manages marketing and CRM (customer relationship management) workflow. This layer also provides for lead/prospect follow-up functions, technical support problems, and product inquiries. The operation layer 42 interfaces with operational staff layer 44 that comprises personal tech support, customer service and analyst information.

The collaboration layer 36 provides for routing of information over the network for sessions and load balancing of the teacher's as well as skills matching. Also included as functions of the collaboration layer 36 is collaboration for shared whiteboard and chat functions that may be required for engaging the learning session in accordance with the present invention.

In relation to the skill matching function, the collaboration layer 36 preferably can select teachers to teach a group of students based on teacher attributes stored in a teacher attribute database. A teacher selection controller (e.g., a server) can select a teacher based on a teacher or student attribute. For example, a teacher proficient in a particular subject or language can be selected to teach targeted students that requires commensurate level of teaching proficiency or language. In this way, more proficient teachers in math or reading can be assigned to teach less proficient students in these subjects. Alternatively, French speaking teachers anywhere in the world with access to the Internet can be selected to teach students (e.g., in Germany, UK, or US) in French.

In relation to the load balancing, the collaboration layer 36 preferably uses the student and teacher attributes to balance teacher utilization loads statically or dynamically as such loads develop. For example, the teacher utilization load can also be balanced by the teacher selection controller in terms of such teacher attributes as hourly rate, geography, overtime requirement, work schedule, and etc. The teacher utilization can also be balanced in terms of such student attributes such as skill level, teacher preference, grade, ethnic background, age, language, character, past record, grade in a subject, and economic background. In this way, the collaboration layer 36 flexibly (either dynamically or statically) utilizes teacher resources by assigning teachers to students that fit a teacher load balancing requirement. For example, teachers in areas that do not experience teacher shortages are used in areas where there is a teacher shortage. The total number of utilized teachers at a given time is adjusted by the server based on teacher attributes, student attributes, the total number of current learning sessions, and the total number of students currently in learning sessions. The present system performs a capacity planning by determining how many sessions are to be held during a given time. The system then determines how many teachers are currently assigned for teaching during that given time. The system uses this data to determine how many more teachers are needed. By performing the capacity planning, the system arranges for scheduling more teachers during specific times ahead where teacher shortages are expected. Real-time assignments occur based on teacher attributes, student attributes, and system's physical requirements when teachers and students log in for learning sessions at a particular time.

Through the operation layers of FIG. 4, the teacher and student workstations 32 and 34 can interact with each other with or without an intervening server. Various application programs for supporting the operations layers can be run by any of the server, workstations 32 and workstations 34 or any combination of them. The learning center server 10 can execute the user interface layer 30 to interface with client stations. As shown, the user interface layer 30 is capable of receiving input from multiple student workstations and multiple teacher workstations.

In one embodiment, each workstation 32 or 34 can be a personal computer capable of running software or terminals with display and input devices without much processing power. As stated above, the collaboration layer 36 is responsible for routing and collaborating services offered by the present invention. The collaboration layer 36 allows utilization of Voice Over Internet Protocols (VOIP) standards in maintaining interactive channels for transmitting audio and video information. VOIP standards allow use of a uniform voice to student. An interactive channel formed of one or more networks is used for holding an interactive session between a teacher and a student. The interactive session allows the teacher and the student to interact with each other through workbooks and a shared whiteboard during a learning session. A shared whiteboard is a shared display space reserved by the system for conducting interactive learning activities using various tools such as interactive highlighters, drawing and graphical tools, and etc. The collaboration layer 36 also supports chat, e-mail, and other Internet features.

The use of a uniform voice to each student via the collaboration layer 36 is advantageous in maintaining continuity between sessions and during sessions when different teachers are utilized to teach the student. The present invention can modify the real voices of the teachers so that the learning sessions are conducted using a uniform voice, as perceived by the student. For example, a voice of a teacher can be synthesized at client stations and transmitted using a uniform voice based on Voice over IP protocols. The voice conversion can occur at either the client stations or the server. Alternatively, a text-to-speech technology can be used during learning sessions. This technique allows transformation of texts into audio during learning sessions. Texts typed at one of a teacher station and a student station is converted to speech and transmitted over the network in a uniform voice using the Voice over IP technology.

The back-end layer 38 tracks various activities and inputs of each student and records student input data, either automatically through the student workstations 32, or manually as results of teacher inputs from a teacher workstation 34. As will be explained in detail below, the back-end application layer 38 provides for deliveries of student instructional materials and workbooks in accordance with an automatically assessed student profile of each student. The back-end application layer 38 is also responsible for assessments and diagnoses of students to generate student profiles. The student profiles are then used by the system to generate electronic student workbooks or instructional materials personalized for each student. In the automated assessments and diagnoses of students, each student receives instructions directly from a computer through an interactive channel formed of one or more networks.

The workstations 32 and 34 can be pen-based, equipped with an audio headset, camera, mouse and keyboard for communicating texts, visual and audio information with each other. In this way, for example, each student takes a battery of tests at a student workstation 32. The assessment tests are generally designed to identify student abilities to perform different tasks or a mastery of certain learning objectives or skills. The assessment tests are scored and analyzed by the back-end layer 38 to generate a student profile which is utilized by the system of the present invention to prescribe a learning program suited for that student and deliver electronic student workbooks and learning materials to student workstations 32. Ongoing assessments of students' performances during learning sessions are used to expand and update student profiles. Results of initial and ongoing assessment tests are used in creating instructional materials comprising lessons prescribed for addressing identified skill gaps of the student.

Once the battery of tests is completed, the system assesses the tests and provides a student profile. A director of education (DE), some other manager or supervisor, or a teacher then preferably evaluates the profile. Notes and comments can be entered in teacher workbooks that are generated based on the student profile data. Such additions to teacher workbooks are used by instructional material controller (teacher stations or servers) in generating student workbooks or deliver instructional materials. As stated before, instructional materials include instructional software, practice sheets, electronic books, work sheets, practice sheets, problem sets, and reference tools, such as dictionary, encyclopedia, thesaurus, calculator, and etc.

The back-end application layer 38 is also responsible for delivering instructional materials to a user interface layer 30. Teacher or student workbooks or instructional materials are automatically generated by computers based on statistical analyses of one or more student profiles. Student workbooks can also be generated with teacher inputs using student profile data.

The back-end application layer 38 also tracks deliveries of instructional materials to student workstations for charge calculation purposes. As such, the back-end application layer 38 also performs credit card processing and billing functions, for example, on a session by session basis, time or other criteria.

An important feature of the present invention is that teachers and students can carry on learning sessions from any available networked workstations as long as their access rights can be verified via log-in processes. For example, teacher would log in at the start of a session. This establishes the rights and privileges of the teacher.

Figure 5:
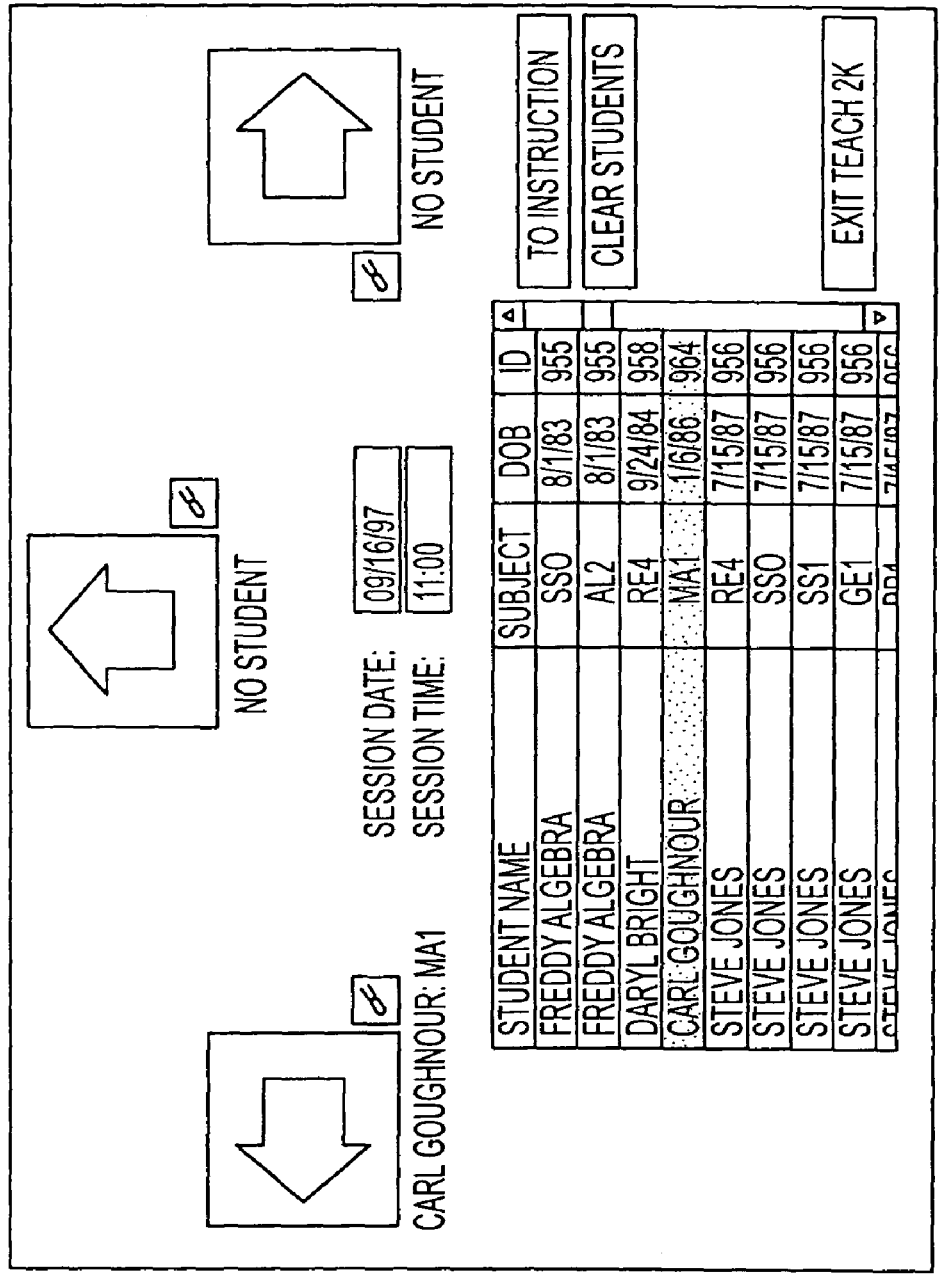
FIG. 5 is an exemplary teacher screen for the system of the present invention.

FIG. 5 shows an exemplary teacher screen after logging in. The screen allows a teacher to select a certain number of students in any local or remote locations. The teacher enters student names at the teacher screen of FIG. 5. In FIG. 5, the teacher has touched the name Carl Goughnour with her pen. From that point in time, the teacher may select other students at other local or remote workstations to conduct learning sessions with them.

After selecting several students in the screen of FIG. 5, the teacher can hold multiple learning sessions with the students. One or more students or groups of students can engage in separate non-interactive learning sessions, while the teacher is engaged in at least one interactive session with another student or a group of students. As stated before, the interactive learning session, which can be held separately from the non-interactive sessions, is an interactive session in which the teacher and one or more students interact or otherwise collaborate on instructional material on a shared time basis. After an interactive session, the teacher may assign other instructional materials for non-interactive sessions by calling up an exercise in the teacher workbook and then forwarding the exercise or material to a student workbook for the student to do unassisted. When a teacher is not done with working with a student, other students could continue with non-interactive learning sessions by using student workbooks, which can be assigned manually by the teacher or assigned automatically by the system of the present invention. Upon completion of various stages of learning sessions, student workbooks may be marked and inputs automatically stored in the database for student profiles.

Figure 6:
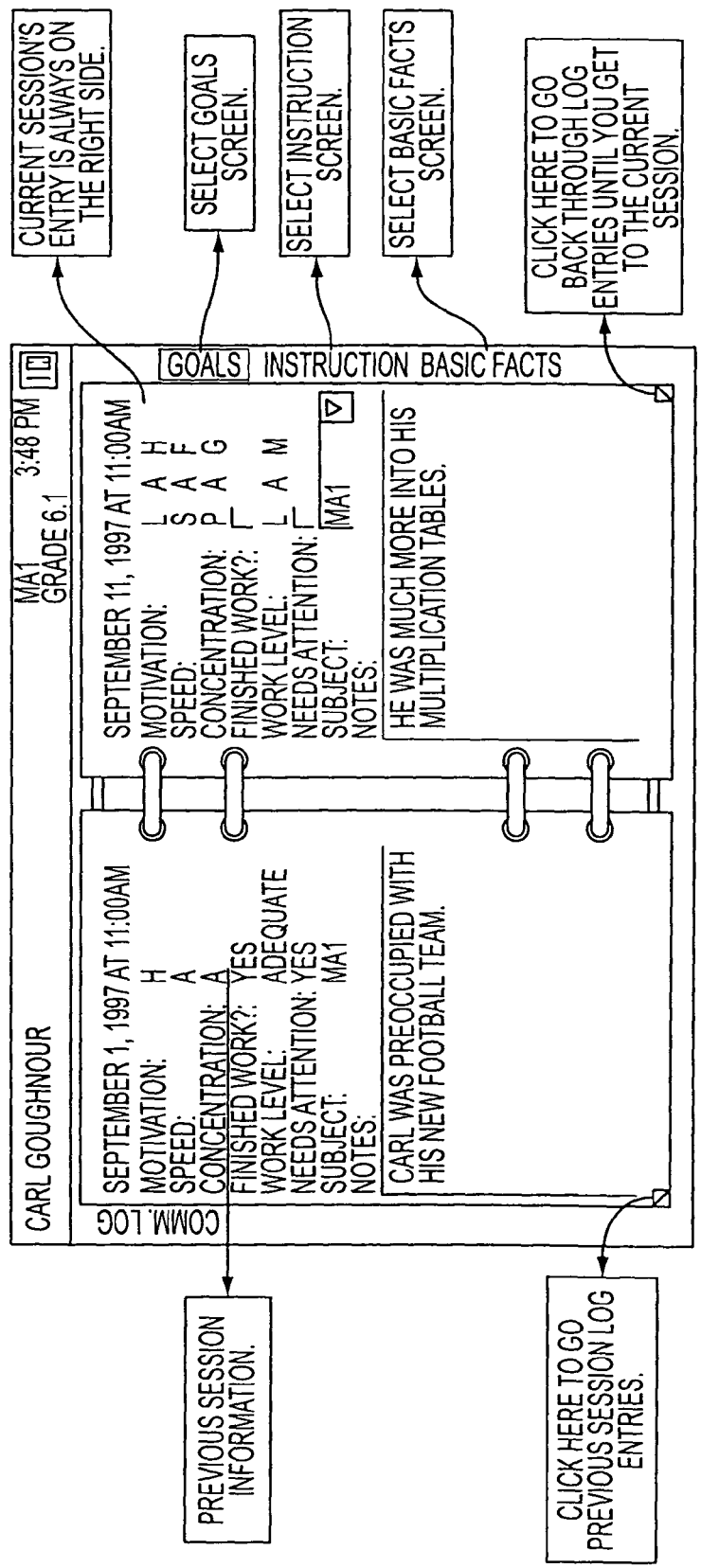
FIG. 6 is an exemplary communications log section of an electronic teacher workbook according to the invention.

FIG. 6 shows an exemplary communication log screen for a student for viewing by a teacher. The top portion of the screen, approximately top 5%, is a status section. This screen displays the current student (Carl Goughnour), grade level (Grade 6.1), program (MA1), date and time (Sep. 11, 1997 at 11:00 am).

The remaining portion of the screen of FIG. 6 follows the workbook metaphor and displays a section of the electronic teacher workbook. Tabs are used on the left and right sides of a given section to switch between various teacher workbook sections. FIG. 6 shows tabs for Communication Log, Goals, Instruction, and Basic Facts sections. Entries on the right hand page of the notebook reflect the current session. Previous session information is given on the left-hand page. Current session information can be entered on the right-hand page by the teacher. The current session information is used to update the student profile. By clicking on the "Goals" tab of the teacher workbook shown in FIG. 6, the Goals and Special Notes section of the teacher workbook shown in FIG. 6 appears.

Figure 7:
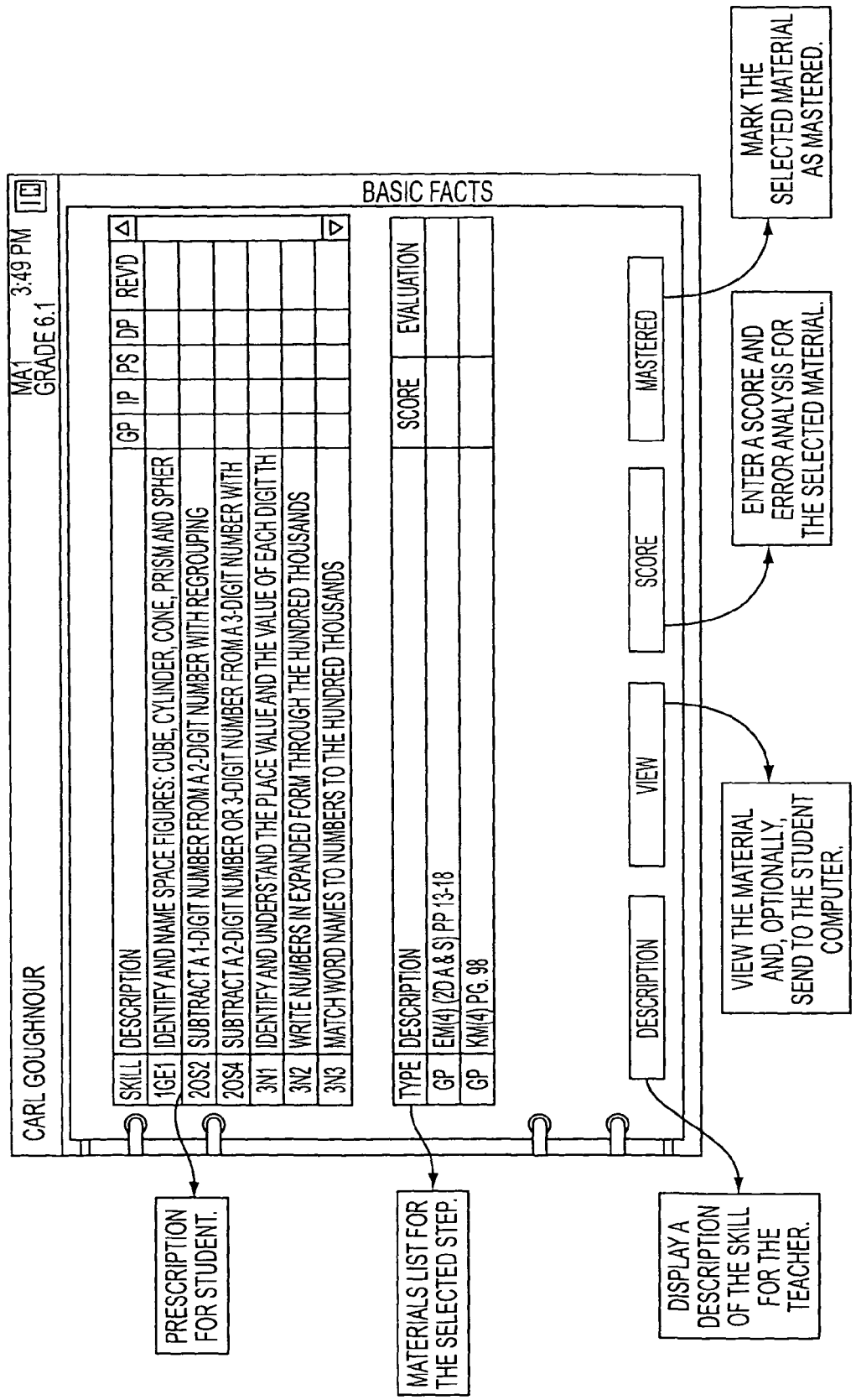
FIG. 7 is an exemplary instruction section from an electronic teacher workbook according to the present invention.

FIG. 7 shows an exemplary instruction section of a teacher workbook, where skills identified from analyses of student profiles as areas to be improved are displayed for the teacher. The 'View' button at the bottom of the screen in FIG. 7 allows the teacher to view a selected instructional material before sending it to the student's workstation.

The present system can automatically generate a number of instructional materials for a student based on the student profile of the student to address skill gaps of the student. Appropriate instructional material commensurate with learning levels and attributes of a student can be automatically created. A teacher for a particular session can view a list of available instructional material automatically generated for the session and select the ones he or she wants to assign to the student. The teacher can assign the selected instructional material to the student from the teacher workstation. Alternatively, the assignment can also be done by a computer. For example, the back-end application layer 38 in conjunction with a database of a controller (server or a teacher workstation) can create unique original lessons with teacher or computer assigned tasks for addressing particular skill gaps. The computer assigned tasks can be generated using a computer adaptive assignment process that relies on retrieved student attributes and profile data. The student attributes or profile data can be retrieved from a database and include various student related information, such as skill levels, grades, ethnic backgrounds, ages, languages, characters, past records, scores, grades in one or more subjects, economic backgrounds, or any other information useful in teaching students.

Existing instructional materials can be customized for each student based on his or her profile data stored in the system of the present invention. For example, based on a language identification parameter, which can be the ethnic background of a student, stored in a student profile database, the present invention can present instructional material for a particular subject, e.g. math, in the native language of the student. Using one or more of access, interface and integration application layers, the system of the present invention can access other student information databases, e.g., public and private school system databases, to determine/retrieve student profile data and to transform the existing instructional material commensurate with the instructional needs of the students. For example, $3^{rd}$ grade math problem sets developed for English speaking students can be transformed to problems in Spanish for Hispanic students.

In order to determine whether the system of the present invention is working properly, accurate records are necessary.

To this end, the system can allow for automated record keeping, storage and analysis. Records may also be kept on a global basis in order to evaluate the system effectiveness for a large number of students. Statistical information and analysis may be kept, which is useful in evaluating specific instructional materials assembled in the workbooks and relationship of the instructional materials to particular skills. It is important to identify which instructional materials or methods work for teaching a particular concept to students of a particular skill, a particular age, or certain demographic or other characteristics. The feedback mechanism of the system of the present invention can allow for constant improvement of the entire system. Instructional materials can be analyzed for effectiveness at the same time that students' progresses are noted.

Figure 8:
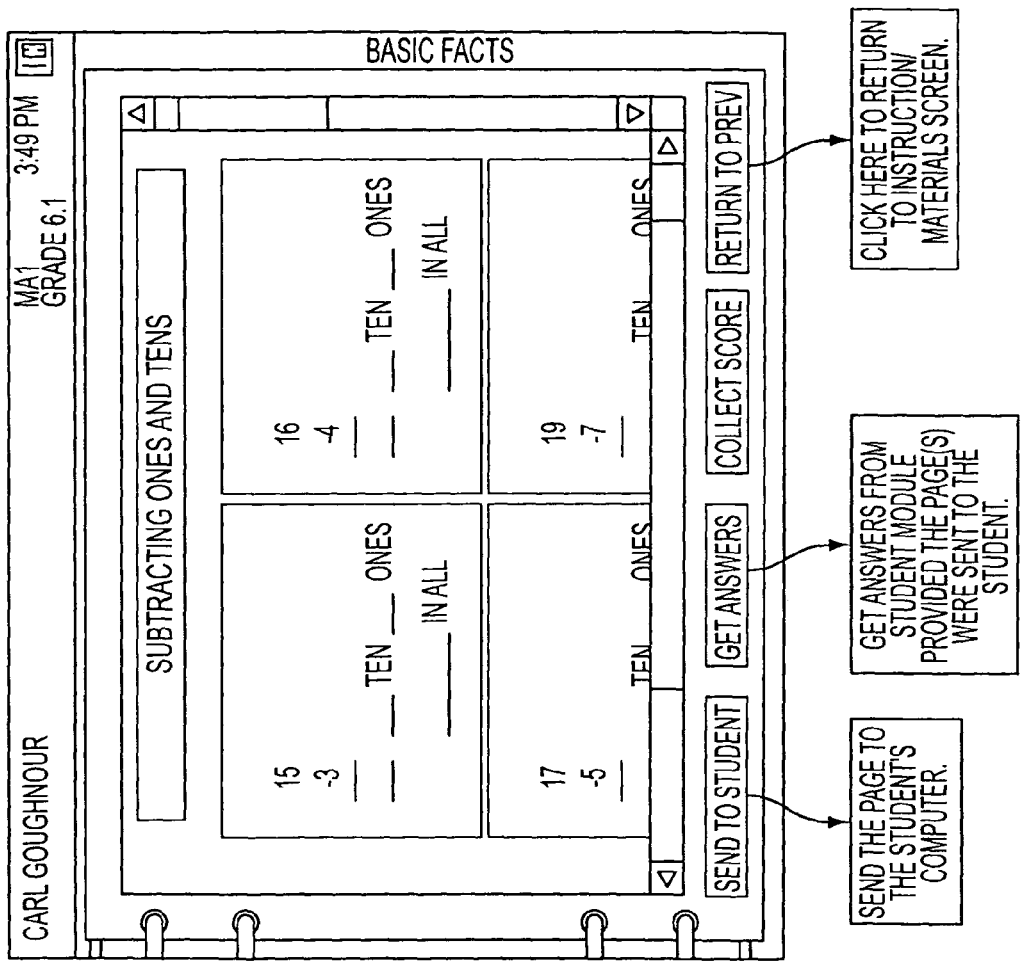
FIG. 8 is an exemplary screen display or page from the teacher workbook according to the invention showing an example of instructional material to be sent to a student after selection from the instruction section.

FIG. 8 shows an exemplary teacher screen showing an automated exercise designed to teach basic math. From the screen of FIG. 8, the teacher has options to send the materials to student workbooks by pressing "Send to Student", get answers from the student by pressing "Get Answers", score the answers by pressing "Collect Score", or return to the instruction session in FIG. 7 by pressing "Return to Prev."

Figure 9:
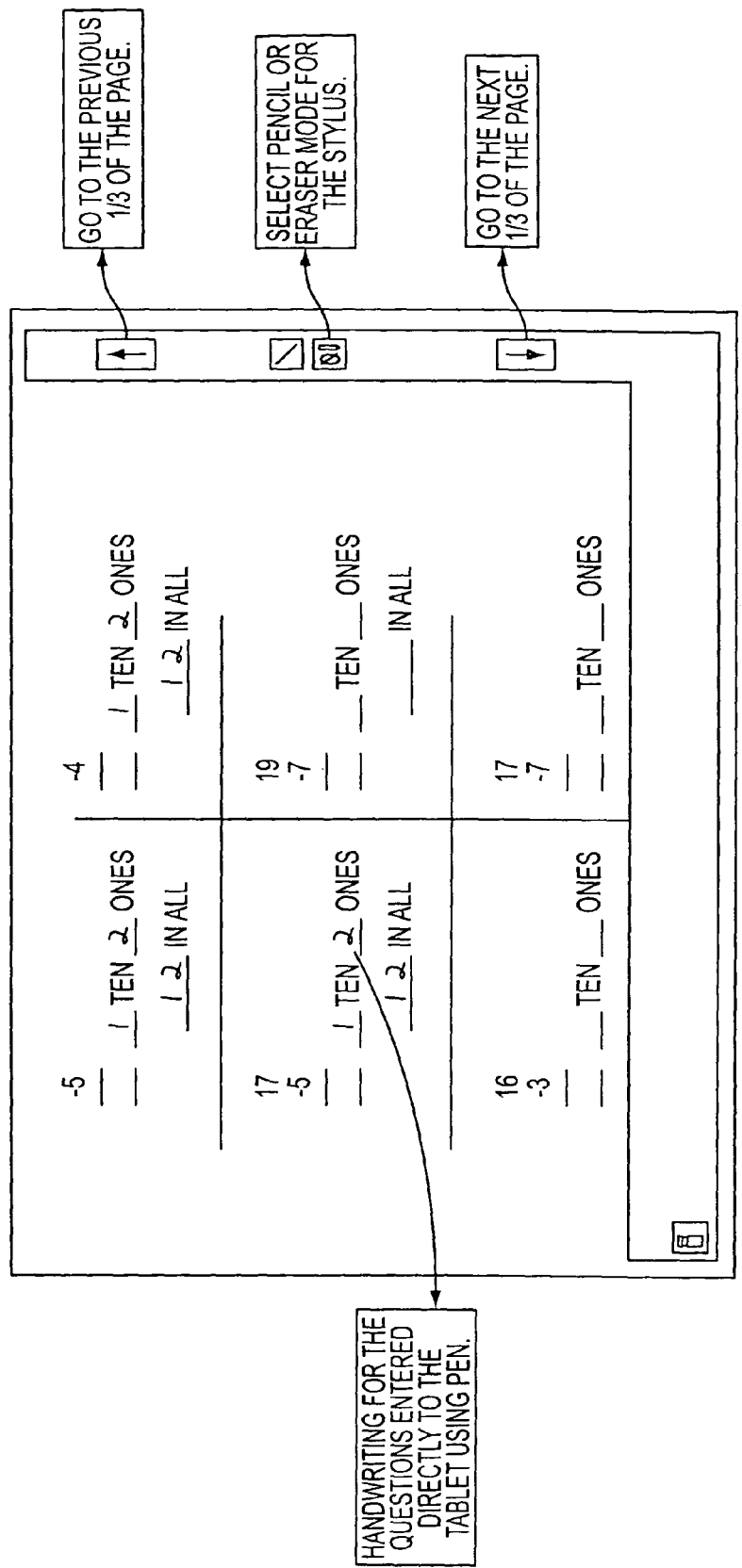
FIG. 9 shows an exemplary page of the electronic student workbook displaying the instructional material of FIG. 9.

FIG. 9 shows an exemplary worksheet of a student workbook which displays the instructional material transferred to the student from FIG. 8. The student can answer the problems by handwriting on the screen. In the meantime, the teacher can concurrently work with a second student by turning to a section of the teacher workbook devoted to the second student and supplying instructional materials at a grade or learning levels appropriate to the second student as determined by the student's profile.

When it is time to review an exercise of the first student, the teacher can call up the work sheet from the student workbook of the first student to the teacher workstation 34 where it may be evaluated. Both the student and the teacher may look at the worksheet on the shared whiteboard designated for the student. The teacher may call up correct answers for comparison with the student's answers and discuss the answers orally or in writing. The teacher can also amend the student profile.

Figure 10:
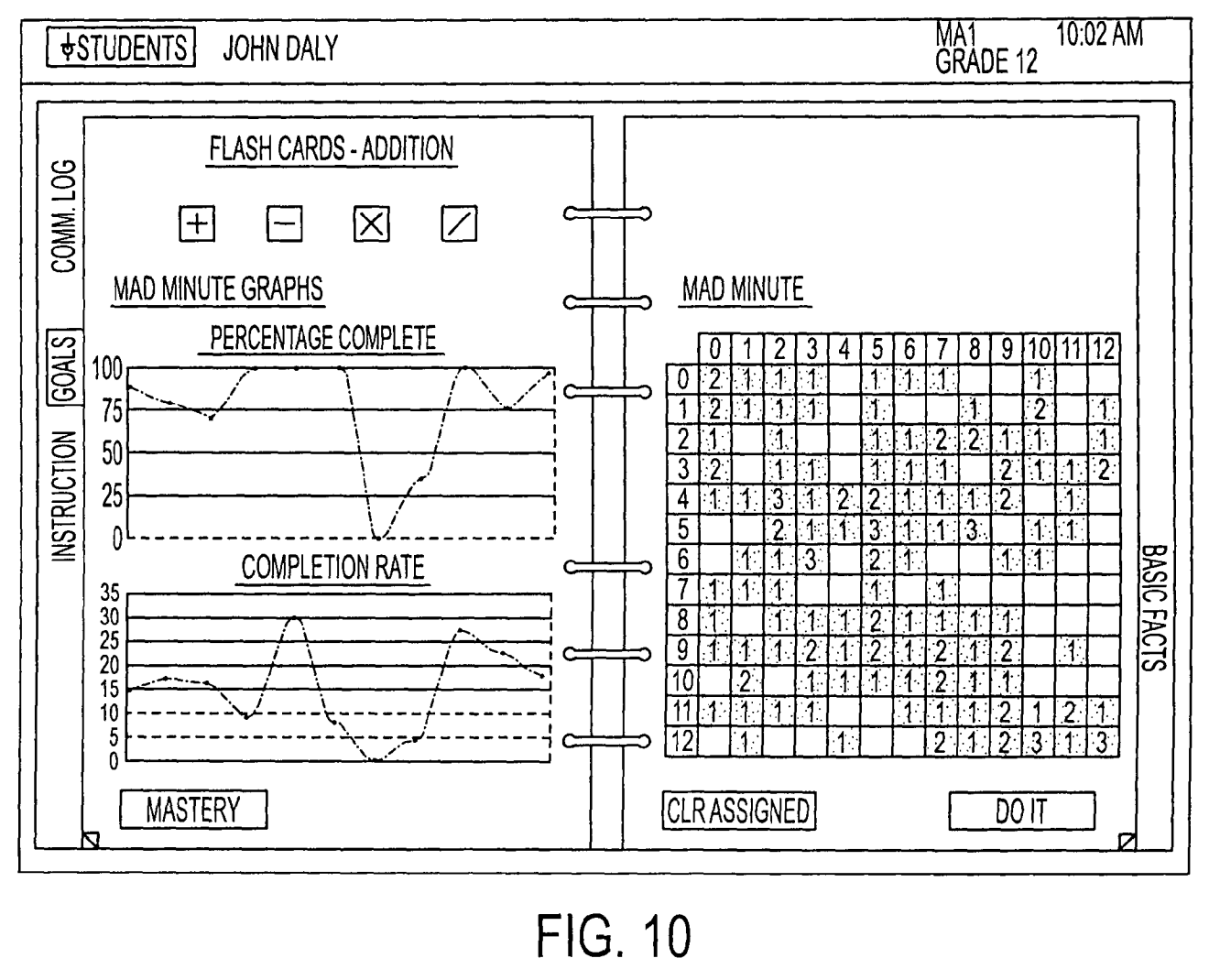

FIG. 10 illustrates an exemplary application in a teacher workbook for mastering addition, subtraction, multiplication and division tables. The teacher will select addition, subtraction, multiplication or division problems, by touching the appropriate symbol on the left-hand page of the notebook. In FIG. 10, addition has been selected. The teacher may also assign particular addition problems, by touching the appropriate square on the right hand page in FIG. 10. For example, if the square at the intersection of 0 and 1 is selected, the student is given the problem "0+1=?." Any number of problems can be assigned, but if none are assigned, then the program will assign problems randomly. During and after each learning session, student inputs are scored/analyzed to create reports for parents.

FIG. 11 illustrates an exemplary progress assessment report accessible by a director or a parent via a parent site. The directors or parents with access authority can access the present learning system via any networked customer stations to view the reports, which list/analyze student improvements, student performances compared to other students, actual test scores, charts showing student progresses, identified skill gaps that need further improvements, comments by teachers, recommended reading exercises or activities for students between learning sessions, etc.

Figure 12:
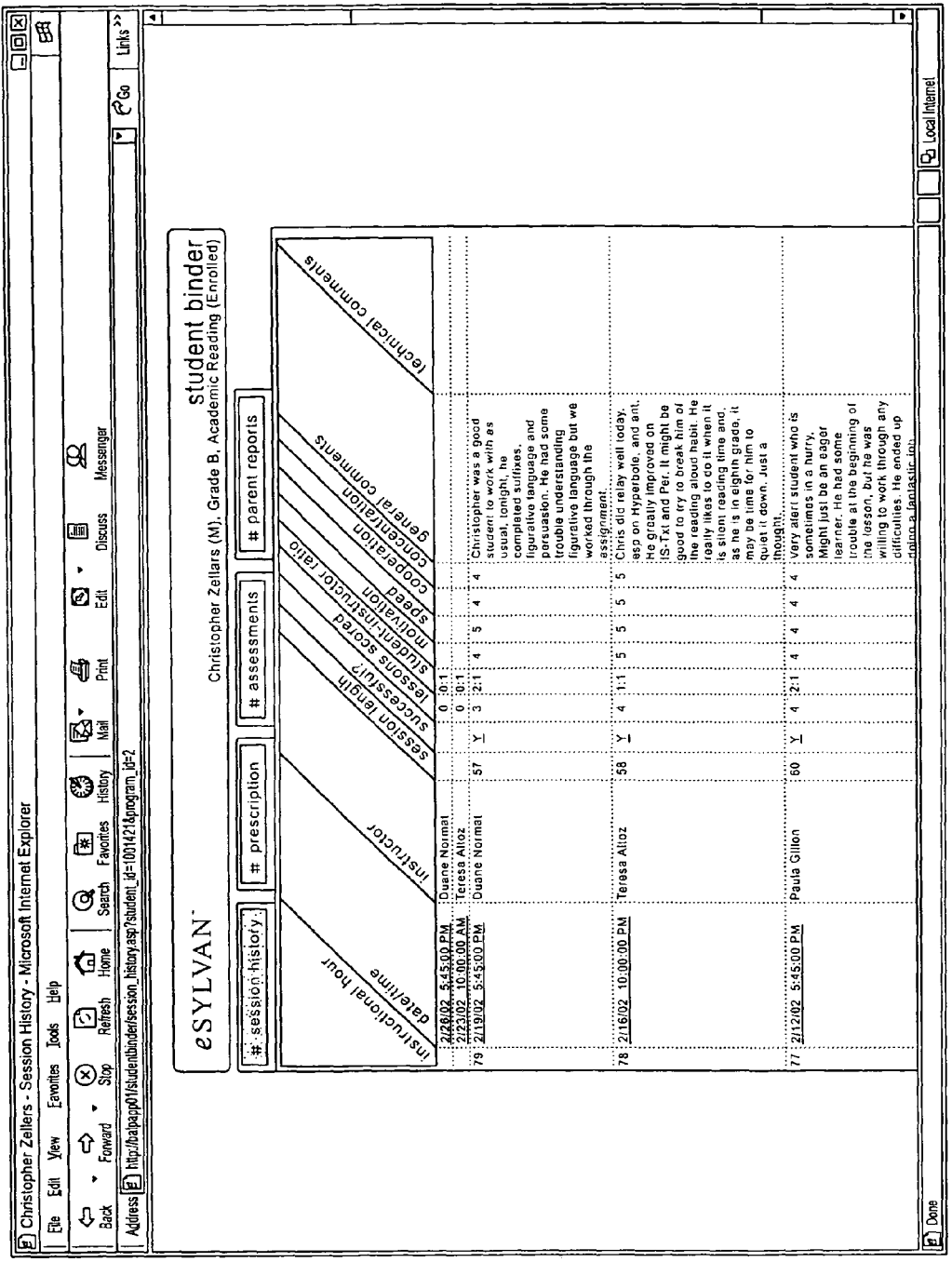
FIG. 12 shows an exemplary session history accessible by a parent via a parent site.

FIG. 12 illustrates an exemplary session history accessible by a director or a parent via a parent site. The directors or parents with access authority can view comments by teachers to determine how students performed during previous learning sessions. For a predetermined period of time after each learning session, teachers can enter their comments on student performances.

From the foregoing, it would be appreciated that the present invention provides an educational system that is cost effective by allowing a teacher to teach several students at the same time but still give individual attention to each student. Present invention also provides individualized educational sessions geared for each student based on the student's skill, educational goals and background without having to incur the cost of employing a dedicated teacher for the student and manual tests/assessments of the student's skill, educational goals and background.

While the invention has been described with reference to several particular embodiments thereof, those skilled in the art will be able to make the various modifications to the described embodiments of the invention without departing from the true spirit and scope of the invention.

The invention claimed is:

1. A learning system, comprising:
   a plurality of teacher stations and a plurality of student stations for holding one or more interactive learning sessions on a subject between a teacher of a plurality of teachers and at least two students, wherein the teacher and the at least two of the students interact with each other using free-style handwriting via a shared electronic white board of at least one of the plurality of teacher stations and at least two of the plurality of student stations;
   a database that stores at least one teacher attribute and at least one student attribute that relate to a language ability and a subject proficiency for the subject; and
   a server in communication with the database that:
   (i) serves computer generated instructional material relating to the subject to the at least two students through the at least two student stations, the computer generated instructional material for creating an interactive learning environment during the one or more interactive learning sessions, and wherein the computer generated instructional material is customized for the at least two students based on the language ability of each of the at least two students as determined by the server through each of the at least two student's respective student attributes stored in the database; and
   (ii) after serving the computer generated instructional material to the at least two students, selects the teacher from the plurality of teachers for the at least two students based on the language ability and the subject proficiency of each of the respective plurality of teachers teacher attributes stored in the database, wherein the teacher teaches the subject to the at least two students during the one or more interactive learning sessions in a language determined based on the language ability.

2. The learning system of claim 1, wherein the computer generated instructional material comprises at least one of instructional software, an electronic text book, a work sheet, a practice sheet, and a problem set.

3. The learning system of claim 1, wherein the computer generated instructional material comprises a test for assessing at least one skill gap.

4. The learning system of claim 1, wherein the computer generated instructional material comprises a lesson prescribed for addressing at least one skill gap.

5. The learning system of claim 1, wherein the computer generated instructional material is automatically created during an interactive practice session, while at least one other student is involved in a non-interactive learning session.

6. The learning system of claim 1, wherein the computer-generated instructional material is generated using a computer adaptive assignment process.

7. The learning system of claim 1, wherein the database comprises at least one of a central database and a distributed database.

8. The learning system of claim 1, wherein the database comprises at least one of a public school database and a private school database.

9. The learning system of claim 1, wherein the student attribute further comprises at least one of skill level, grade, ethnic background, age, language, character, past record, grade in the subject, and economic background.

10. The learning system of claim 1, wherein the teacher attribute further comprises at least one of a skill level, a subject proficiency level, an hourly rate, geography, overtime requirement, and work schedule.

11. The method of claim 1, wherein the computer generated instructional material is transformed from a first language to a second different language based on the language ability.

12. A method for learning, comprising
holding one or more interactive learning sessions on a subject between a teacher and at least two students, wherein the teacher and at least two of the students interact with each other using free-style handwriting via a shared electronic white board of at least one of a plurality of teacher stations and at least two of a plurality of student stations;
retrieving at least one teacher attribute and at least one student attribute relating to a language ability and a subject proficiency for the subject from a database;
serving computer generated instructional material relating to the subject to the at least two students through the at least two student stations, the computer generated instructional material for creating an interactive learning environment during the one or more interactive learning sessions, and wherein the computer generated instructional material is customized for the at least two students based on the language ability of each of the at least two students as determined by a server through each of the at least two student's respective student attributes stored in the database; and
after serving the computer generated instructional material to the at least two students, selecting the teacher from a plurality of teachers for the at least two students based on the language ability and the subject proficiency of each of the respective plurality of teachers teacher attributes stored in the database, wherein the teacher teaches the subject to the at least two students in a language determined based on the language ability.

13. The method of claim 12, wherein the at least one student attribute relating to the language ability of the student is retrieved from a database that comprises at least one of a central database and a distributed database.

14. The method of claim 13, wherein the database comprises at least one of a public school database and a private school database.

15. The method of claim 12, wherein the computer generated instructional material is transformed from a first language to a second different language based on the language ability.

* * * * *